(12) United States Patent
Deng et al.

(10) Patent No.: US 7,832,781 B2
(45) Date of Patent: Nov. 16, 2010

(54) MAP POCKET CLOSE-OUT AS INTEGRATED PELVIC BOLSTER FOR VEHICLE DOOR

(75) Inventors: Zhibing Deng, Northville, MI (US); Nagaraj Mariyapp, Rochester Hills, MI (US); Alvin Lee, Novi, MI (US); John Pinkerton, Canton, MI (US); Michael Dong, Novi, MI (US); Richard Wang, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/350,290

(22) Filed: Jan. 8, 2009

(65) Prior Publication Data

US 2010/0171337 A1 Jul. 8, 2010

(51) Int. Cl.
 *B60J 5/00* (2006.01)
(52) U.S. Cl. .............. 296/37.13; 296/146.7; 296/187.12
(58) Field of Classification Search .............. 296/37.13, 296/146.7, 187.12; 280/751
 See application file for complete search history.

(56) References Cited

U.S. PATENT DOCUMENTS

| | | | | |
|---|---|---|---|---|
| 5,857,702 A | * | 1/1999 | Suga et al. | 280/751 |
| 6,474,721 B2 | * | 11/2002 | Nishikawa et al. | 296/146.6 |
| 7,265,306 B2 | * | 9/2007 | Radu | 200/310 |
| 7,413,237 B2 | * | 8/2008 | Heinze et al. | 296/146.7 |
| 2006/0154027 A1 | * | 7/2006 | Dry | 428/138 |

FOREIGN PATENT DOCUMENTS

| | | | |
|---|---|---|---|
| JP | 42992 | * | 2/1999 |
| JP | 16208 | * | 1/2000 |
| JP | 159029 | * | 6/2000 |
| JP | 300417 | * | 10/2003 |
| JP | 290113 | * | 10/2006 |

\* cited by examiner

*Primary Examiner*—Dennis H Pedder
(74) *Attorney, Agent, or Firm*—Shook, Hardy & Bacon L.L.P.

(57) ABSTRACT

An integrated combined extended map pocket close-out and pelvic bolster component for attachment to a door trim substrate used in a vehicle door is disclosed. The component comprises a map pocket close-out portion, a pelvic bolster portion, and a bridge connecting the map pocket close-out portion and the pelvic bolster portion. The pelvic bolster portion is substantially hollow and preferably defines a box. The component includes a plurality of walls and the thickness of some of the walls is greater than the thickness of other walls. One or more of the walls may be angled. The map pocket close-out portion has a depth and the pelvic bolster portion has a depth. The depth of the map pocket close-out portion is greater than the depth of the pelvic bolster portion. The one-piece component is a molded component formed from a polymerized material.

15 Claims, 6 Drawing Sheets

MAP POCKET CLOSE-OUT AS INTEGRATED PELVIC BOLSTER FOR VEHICLE DOOR

TECHNICAL FIELD

The present invention relates generally to collapsible door structures for use with vehicle doors. More particularly, the present invention relates to an integrated combination map pocket close-out and pelvic bolster for attachment to a door trim. The integrated combination map pocket close-out and pelvic bolster is formed from a single component such as a sheet of a polymerized material.

BACKGROUND OF THE INVENTION

Side impact events in vehicles have been identified as one of the top priorities for both research and regulation with government requirements continuing to become more stringent. An important element in providing proper support for the pelvic area of a vehicle occupant, the pelvic bolster is provided on the inner side of the door trim substrate adjacent the outer door sheet metal. As in many areas of vehicle development, regulations related to side impact events continue to develop. These regulations often impact the safety of the occupant relative to the pelvic region and accordingly involve the design and construction of the pelvic bolster itself.

Pelvic foam, usually expanded polypropylene (EPP) or polyurethane (PUR), has been typically used as a pelvic bolster for energy absorption upon pelvic contact with the door trim in high speed side collision. The pelvic foam bolster is typically attached to door trim. Plastic devices have also been used in replacing the pelvic foam to achieve the same objective. In either case, a separate piece of parts in each door is used to achieve the function of a pelvic bolster.

While achieving a certain degree of protection to the vehicle occupant, the use of the pelvic foam component is not an optimal response to the requirements. Particularly, the use of the pelvic foam component requires the use of separate components, adding to manufacturing cost and to assembly cost.

Accordingly, as in so many areas of vehicle technology, there is room in the art of vehicle door design for an alternative configuration to known pelvic bolster structures which provides effective protection that can be adapted to a variety of shapes while maintaining relatively low manufacturing and assembly costs.

SUMMARY OF THE INVENTION

The disclosed invention overcomes the limitations of the prior art by providing a door trim map pocket close-out that is extended to form a box in the pelvic contact region. This box, in combination with engineered map pocket walls, creates an area that functions like a pelvic bolster for side impact, which in turn eliminates the pelvic foam. The design of the box involves not only its stiffness but also its location and dimensions.

More particularly, the disclosed invention provides an integrated combined extended map pocket close-out and pelvic bolster component for attachment to a door trim substrate used in a vehicle door. The component comprises a map pocket close-out portion, a pelvic bolster portion, and a bridge connecting the map pocket close-out portion and the pelvic bolster portion. The pelvic bolster portion is substantially hollow and preferably defines a box. The component includes a plurality of walls and the thickness of some of the walls is greater than the thickness of other walls. One or more of the walls may be angled. The map pocket close-out portion has a depth and the pelvic bolster portion has a depth. The depth of the map pocket close-out portion is greater than the depth of the pelvic bolster portion. The one-piece component is a molded component formed from a polymerized material.

The innovation eliminates one part on each door. The integrated pelvic bolster from the map pocket close-out is also easy to implement. Data reveals the design provides superior side impact performance to known foam-based configurations. In a door trim with rear-loaded map pocket it is thus an object of the disclosed invention to extend the map pocket close-out to the pelvic contact zone, thus replacing the typical pelvic foam or any separate pelvic energy absorption part.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
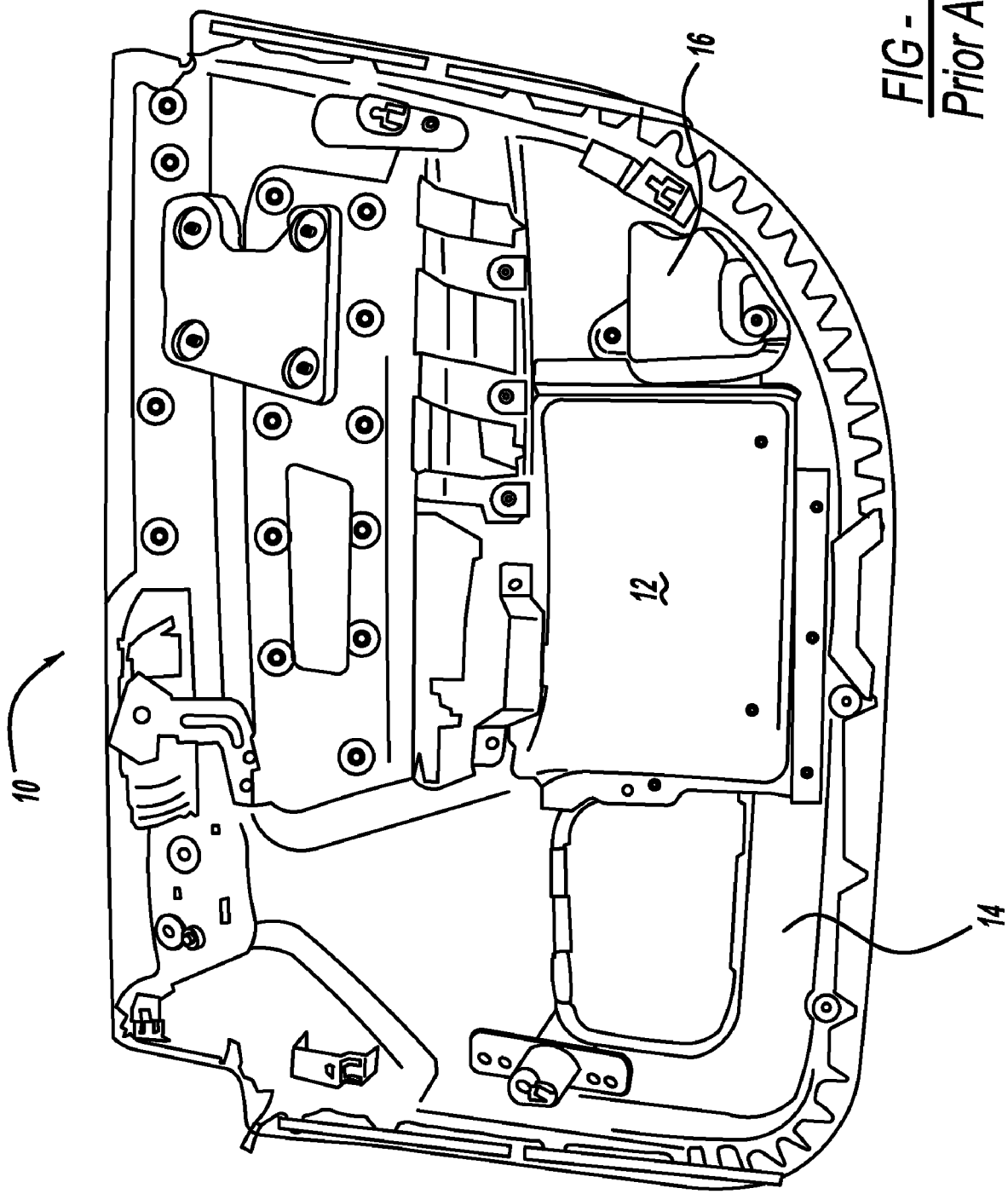
FIG. 1 illustrates a vehicle door trim assembly having a pelvic bolster composed of foam according to the known technology.

In the following figures, the same reference numerals will be used to refer to the same components. In the following description, various operating parameters and components are described for different constructed embodiments. These specific parameters and components are included as examples and are not meant to be limiting.

With reference first to FIG. 1, a vehicle door trim assembly according to the known art, generally illustrated as 10, is shown. The door trim assembly 10 includes a conventional door trim map pocket close-out 12 attached to a door trim substrate 14. As is known in the art, a pelvic, impact energy-absorbing door trim bolster 16 is attached to the door trim substrate 14 adjacent the door trim map pocket close-out 12. The energy-absorbing door trim bolster 16 of the prior art is typically formed from expanded polypropylene (EPP) foam.

Figure 2:
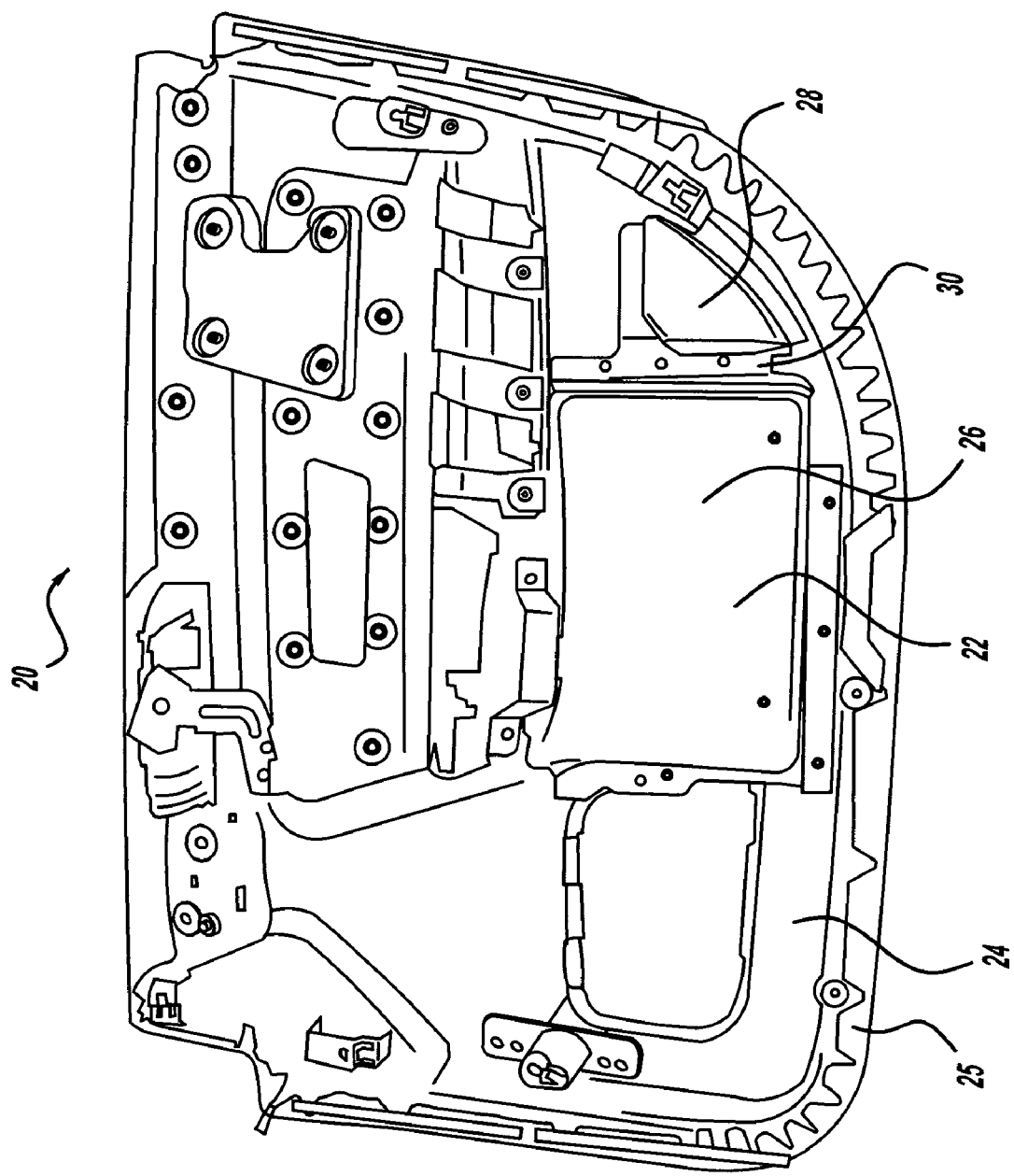
FIG. 2 illustrates a vehicle door trim assembly having an integrated combined extended map pocket close-out and pelvic bolster component according to the disclosed invention.

FIG. 2 illustrates a vehicle door trim assembly according to the disclosed invention, generally illustrated as 20. The vehicle door trim assembly 20 includes an integrated combined extended map pocket close-out and pelvic bolster component 22 attached to a door trim substrate 24. The door trim substrate 24 is attached to an outer sheetmetal 25 as is known in the art. The integrated combined extended map pocket close-out and pelvic bolster component 22 comprises a map pocket close-out portion 26 and an integrally attached pelvic bolster portion 28.

Figure 3:
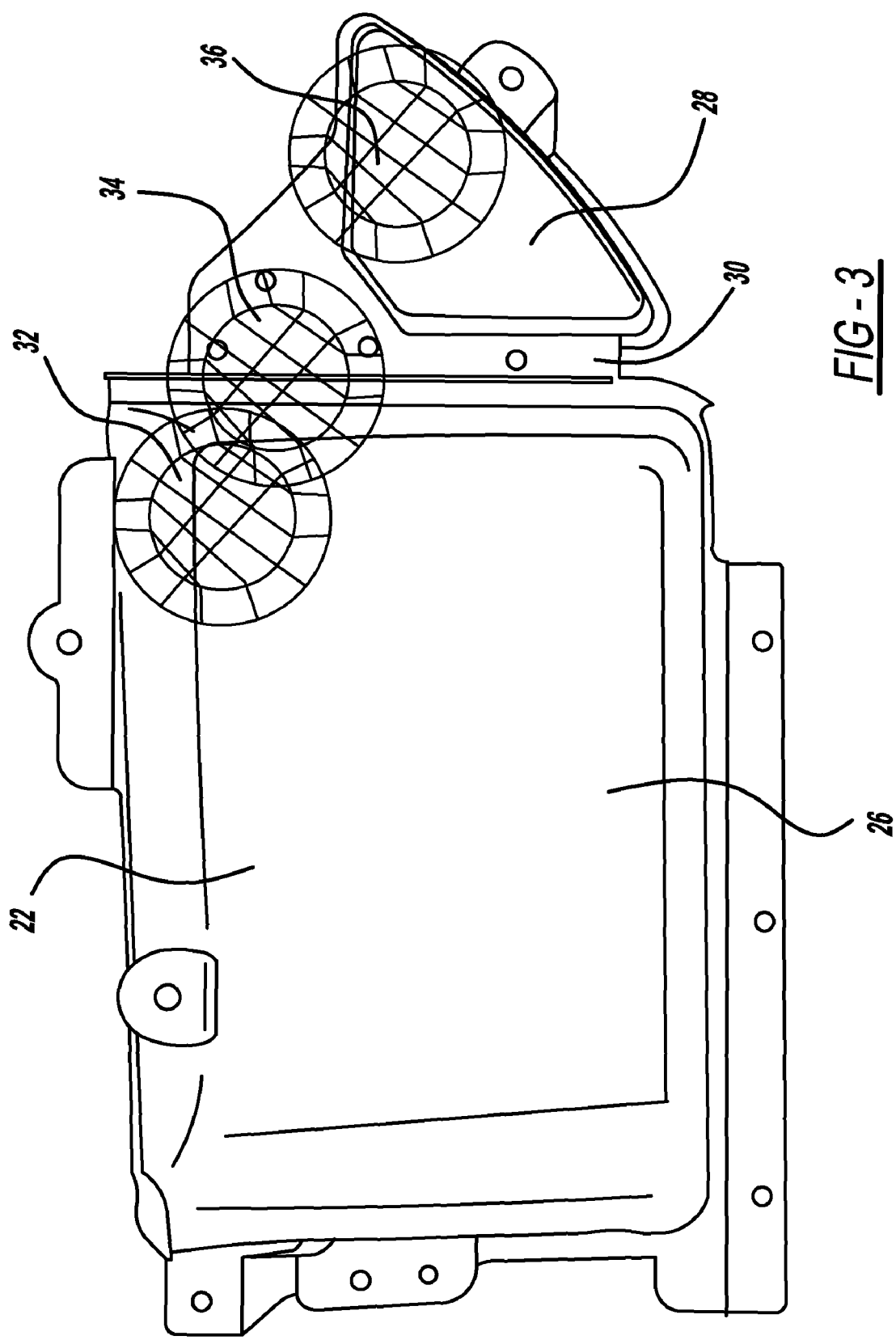
FIG. 3 illustrates a side view of the integrated combined extended map pocket close-out and pelvic bolster component illustrating the pelvis locations.
Figure 4:
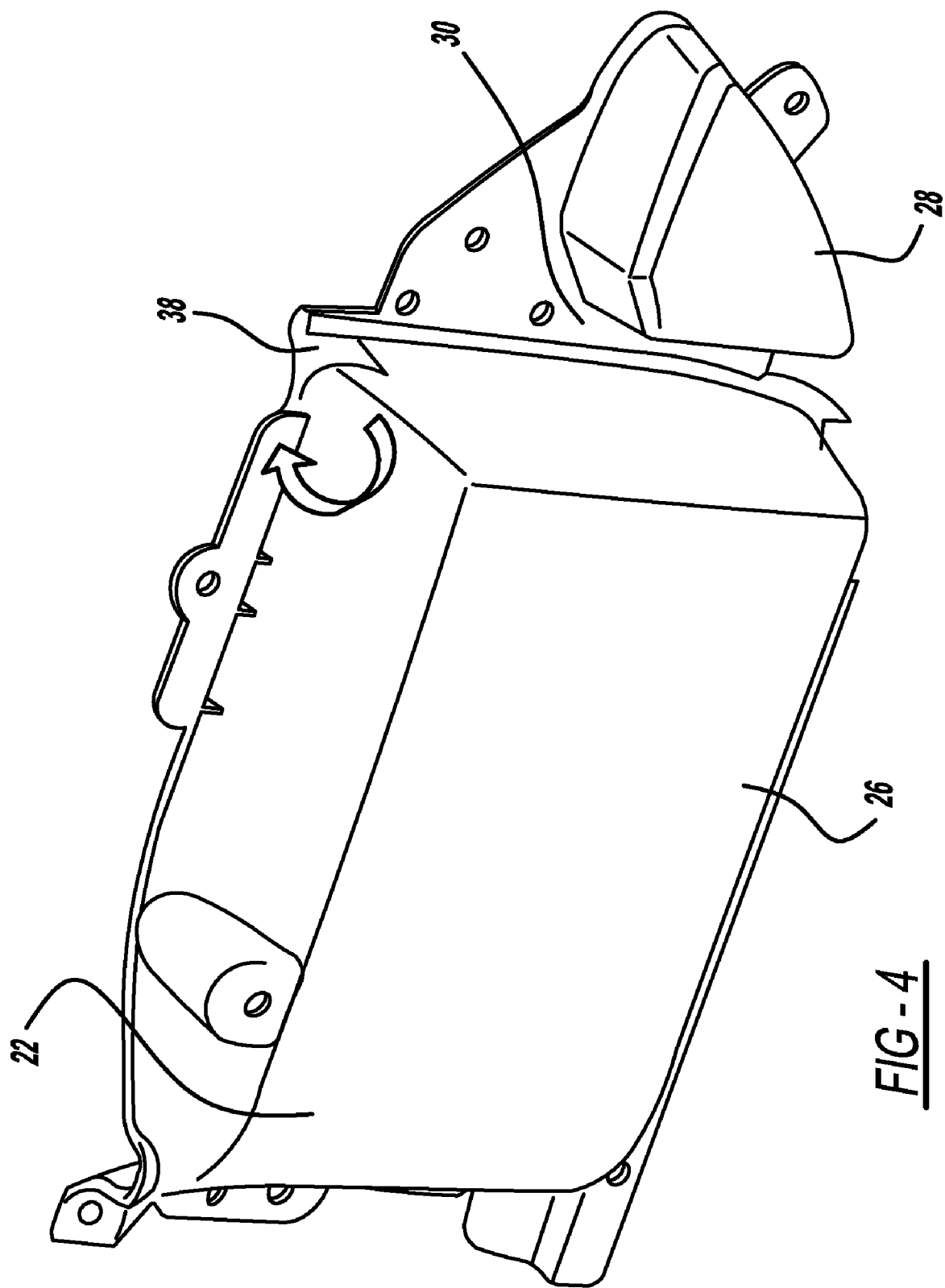
FIG. 4 illustrates a perspective view of the integrated combined extended map pocket close-out and pelvic bolster component of the disclosed invention.
Figure 5:
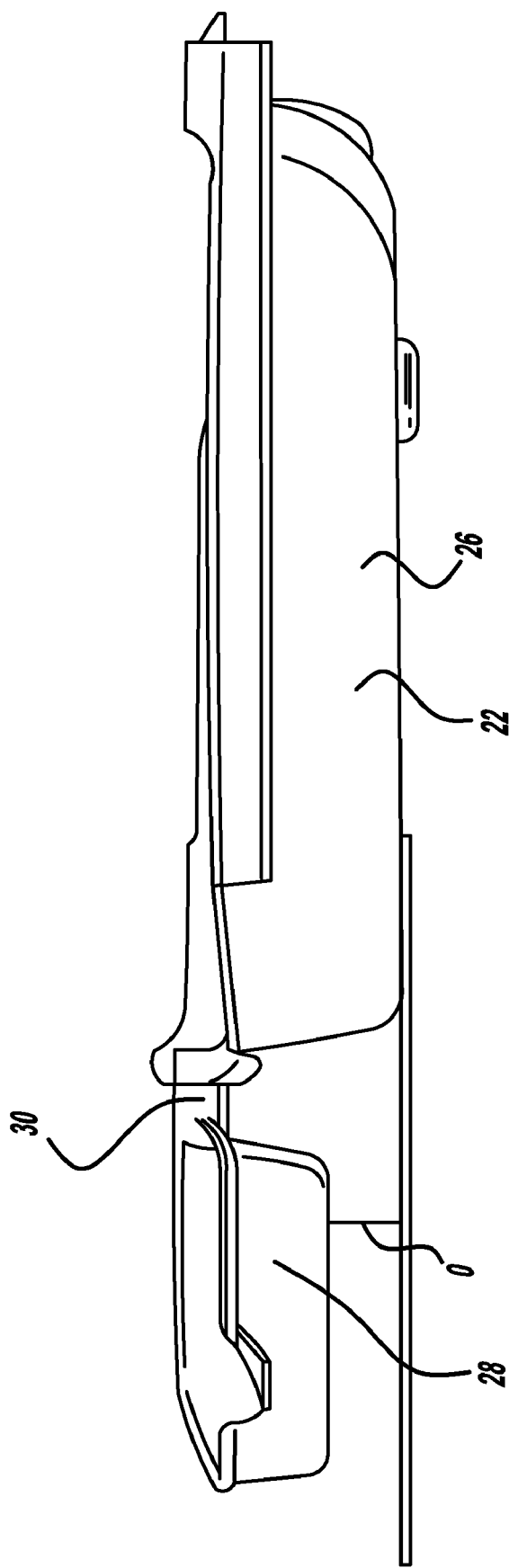
FIG. 5 illustrates an end view of the integrated combined extended map pocket close-out and pelvic bolster component of the disclosed invention.

The integrated combined extended map pocket close-out and pelvic bolster component 22 is itself illustrated more fully in FIGS. 3 through 5. With reference thereto, and with specific reference initially to FIG. 3, the integrated combined extended map pocket close-out and pelvic bolster component 22 includes a bridge 30 formed between the map close-out portion 26 and the pelvic bolster portion 28. The integrated combined extended map pocket close-out and pelvic bolster component 22 is an integrally formed piece and may be manufactured from any of a variety of materials, but is preferably produced from a high impact polymerized material by a molding process although other production processes could well be used.

The map pocket close-out geometry was engineered with the consideration of various pelvis locations along seat travel. Accordingly, for proper alignment of the integrated combined extended map pocket close-out and pelvic bolster component 22 relative to the pelvic area of the occupant, it is understood that different pelvic impact locations are identifiable. For example, pelvic impact location 32 is formed along the edge of the map pocket close-out portion 26, while pelvic impact location 34 is formed generally over the bridge 30, while a primary pelvic impact location 36 (covering approximately the $50^{th}$ percentile).

Referring next to FIG. 4, a perspective view of the integrated combined extended map pocket close-out and pelvic bolster component 22 is illustrated. According to the disclosed invention it is possible to fine tune or optimize the effectiveness of the integrated component 22 by adjusting the thickness of any of the walls of the component 22 at strategic areas. As a non-limiting example, a portion 38 of the map pocket close-out portion 26 having a thinner wall than the adjacent walls may be provided. The integrated combined extended map pocket close-out and pelvic bolster component 22 having one or more strategically placed thin walls would provide for focused and specified crush zones in the event of a side impact, thus providing optimum protection to the adjacent occupant. This configuration is further enhanced by the angling of one or more walls of the map pocket close-out portion 26 in such a way that the focused crush area would be further enhanced and enabled as illustrated by the arrow.

Referring to FIG. 5, an end view of the integrated combined extended map pocket close-out and pelvic bolster component 22 of the disclosed invention is illustrated. As shown the pelvic portion 28 is offset with an engineered amount (illustrated by lateral offset "O") from the map pocket close-out portion 26.

Figure 6:
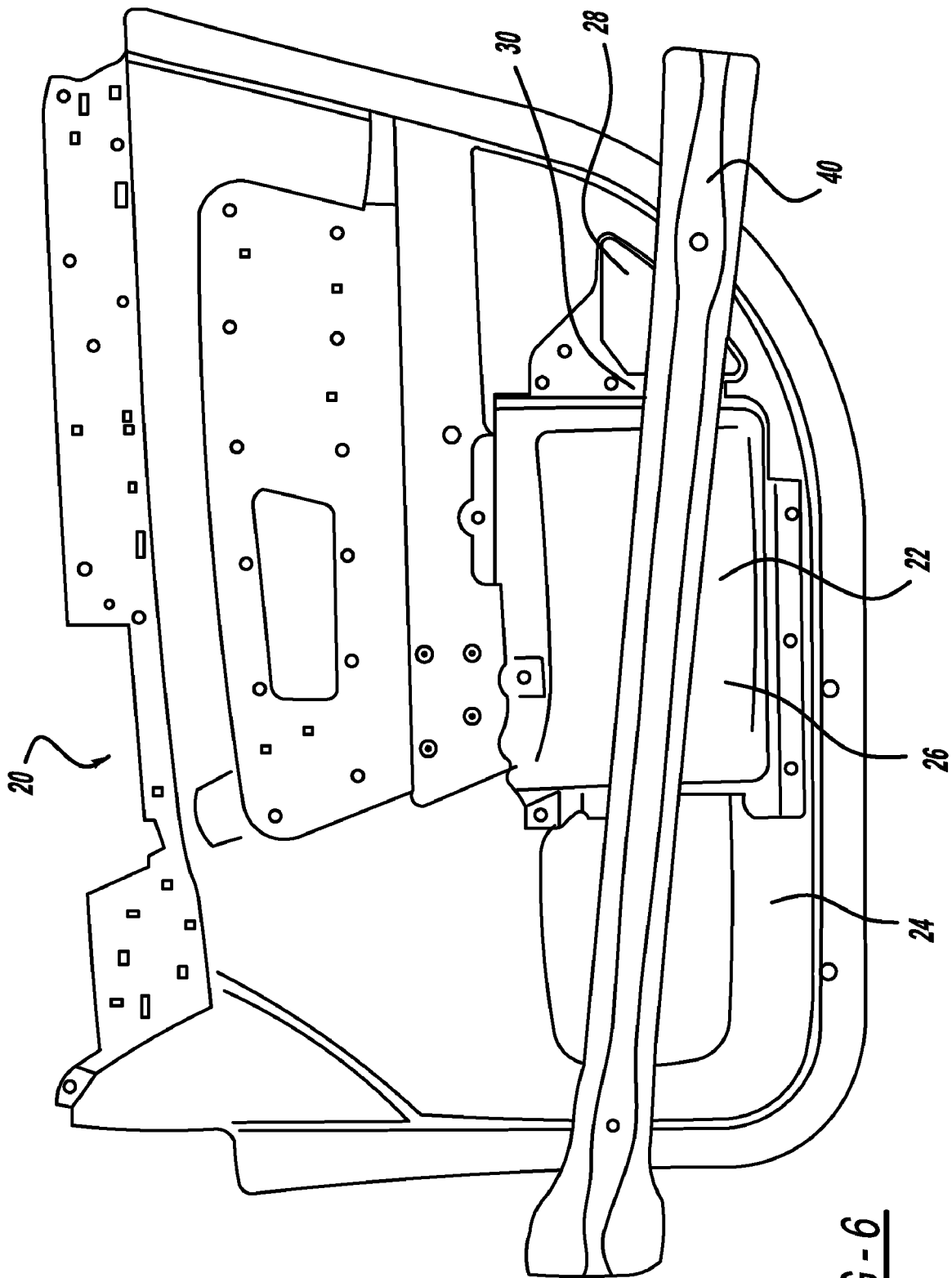
FIG. 6 illustrates the door trim and integrated combined extended map pocket close-out and pelvic bolster component assembly in relation to the vehicle door beam.

The map pocket close-out geometry disclosed herein was engineered with the consideration of possible interactions from a major door structure during side impact. For example, and as illustrated in FIG. 6, the door trim and integrated combined extended map pocket close-out and pelvic bolster component assembly 22 is shown in relation to a door beam 40. As illustrated there is appropriate functional alignment between the integrated combined extended map pocket close-out and pelvic bolster component 22 and the door beam 40 so as to provide effective interaction between these two components in the event of a side impact.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle comprising:
   an outer sheetmetal;
   a door trim substrate disposed adjacent said outer sheetmetal; and
   an integrated, one-piece combination door trim map pocket close-out and pelvic bolster component attached against to said door trim substrate, said pocket having a side and said bolster having a top and a side, said component including a bridge continuously between said side of said pocket and said top and side of said bolster.

2. The door assembly of claim 1 wherein said integrated, one-piece combination door trim map pocket close-out and pelvic bolster component includes a plurality of walls.

3. The door assembly of claim 2 wherein at least one of said plurality of walls is angled relative to the other walls.

4. The door assembly of claim 1 wherein said map pocket close-out portion has a depth and said pelvic bolster portion has a depth, said depth of said map pocket close-out portion being greater than said depth of said pelvic bolster portion whereby said pelvic bolster portion is offset with respect to said map pocket close-out portion.

5. The door assembly of claim 1 wherein said integrated, one-piece combination door trim map pocket close-out and pelvic bolster component is a molded component formed from a polymerized material.

6. A door assembly for use in a vehicle comprising:
   an outer sheetmetal;
   a door trim substrate disposed adjacent said outer sheetmetal; and
   a one-piece component comprising a map pocket close-out portion having a side wall, a pelvic bolster portion having a top wall and a side wall, and a bridge extending between said side wall of said map pocket close-out portion and continuously between said top and side walls of said pelvic bolster portion connecting said map pocket close-out portion and said pelvic bolster portion, said side wall of said pelvic bolster portion opposing said side wall of said map pocket close-out portion.

7. The door assembly of claim 6 further including a wall connecting said top wall of said pelvic bolster portion and said side wall of said pelvic bolster portion.

8. The door assembly of claim 6 wherein said map pocket close-out portion has a depth and said pelvic bolster portion has a depth, said depth of said map pocket close-out portion being greater than said depth of said pelvic bolster portion whereby said pelvic bolster portion is offset with respect to said map pocket close-out portion.

9. The door assembly of claim 6 wherein said one-piece component is a molded component formed from a polymerized material.

10. An integrated, one-piece combination door trim map pocket close-out and pelvic bolster component for use with a vehicle door assembly comprising:
    a map pocket close-out portion having a side, a pelvic bolster portion having a top and a side, and a bridge continuously between said side of said map pocket close-out portion and said top and side of said pelvic bolster portion.

11. The integrated, one-piece combination door trim map pocket close-out and pelvic bolster component of claim 10 wherein said map pocket close-out portion has a depth and said pelvic bolster portion has a depth, said depth of said map pocket close-out portion being greater than said depth of said pelvic bolster portion.

12. The integrated, one-piece combination door trim map pocket close-out and pelvic bolster component of claim 10 wherein said component is formed from a polymerized material.

13. The door assembly of claim 1 wherein said top of said bolster is defined by a top wall and said side of said bolster is defined by a side wall, said bolster further including a wall connecting said top wall and said side wall.

14. The door assembly of claim 13 wherein said wall connecting said top wall and said side wall is angled relative to said top and side walls.

15. The door assembly of claim 7 wherein said wall connecting said top wall of said pelvic bolster portion and said side wall of said pelvic bolster portion is angled relative to said top wall and said side wall of the pelvic bolster portion.

\* \* \* \* \*